(12) United States Patent
Li

(10) Patent No.: US 10,101,849 B2
(45) Date of Patent: Oct. 16, 2018

(54) TOUCH MONITORING METHOD, TOUCH MONITORING DEVICE, AND TERMINAL

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/233,296

(22) Filed: Aug. 10, 2016

(65) Prior Publication Data

US 2017/0235407 A1    Aug. 17, 2017

(30) Foreign Application Priority Data

Feb. 17, 2016    (CN) .......................... 2016 1 0090373

(51) Int. Cl.
| | | |
|---|---|---|
| *G06F 3/041* | (2006.01) | |
| *G06F 11/30* | (2006.01) | |
| *G06Q 10/06* | (2012.01) | |
| *G06F 3/01* | (2006.01) | |
| *G06F 3/023* | (2006.01) | |
| *G06F 1/32* | (2006.01) | |
| *H04L 29/08* | (2006.01) | |

(52) U.S. Cl.
CPC ........ *G06F 3/0416* (2013.01); *G06F 11/3089* (2013.01); *G06F 1/3231* (2013.01); *G06F 3/013* (2013.01); *G06F 3/023* (2013.01); *G06Q 10/06398* (2013.01); *H04L 67/22* (2013.01)

(58) Field of Classification Search
CPC ........ G06F 1/3231; G06F 3/013; G06F 3/023; G06F 3/04895; G06F 11/3089; G06F 3/0416; G06Q 10/06398; Y02B 60/1289; H04L 67/22
See application file for complete search history.

(56) References Cited

U.S. PATENT DOCUMENTS 7,652,583 B2 *   1/2010   Sanchez ............... B60K 28/066
                                                340/575
7,728,819 B2 *   6/2010   Inokawa ................. G06F 3/016
                                                178/18.05
(Continued)

FOREIGN PATENT DOCUMENTS

CN        103218075 A      7/2013
CN        103455261 A     12/2013
(Continued)

OTHER PUBLICATIONS

First Office Action for Chinese Application No. 201610090373.1, dated Apr. 27, 2018, 8 Pages.

*Primary Examiner* — Michael J Jansen, II
(74) *Attorney, Agent, or Firm* — Brooks Kushman P.C.

(57) ABSTRACT

The present disclosure provides a touch monitoring method, a touch monitoring device, and a terminal. The touch monitoring method includes steps of: acquiring a plurality of touch operations performed by a user within a predetermined time period at a predetermined touch region of a terminal; acquiring attribute information corresponding to each touch operation; and prompting the user in accordance with the attribute information corresponding to the touch operations. The touch monitoring device includes an operation acquisition module, an attribute information acquisition module and a prompt module.

15 Claims, 3 Drawing Sheets

(56) References Cited

U.S. PATENT DOCUMENTS

| | | | | |
|---|---|---|---|---|
| 8,447,607 B2* | 5/2013 | Weider | ............... | G06F 17/30864 704/250 |
| 8,812,428 B2* | 8/2014 | Mollicone | ........... | G06F 19/3431 600/300 |
| 8,830,198 B2* | 9/2014 | Luo | ....................... | G06F 3/0233 345/173 |
| 9,268,405 B2* | 2/2016 | Bailey | ..................... | G06F 3/017 |
| 9,372,614 B2* | 6/2016 | Feldstein | ............... | G06F 3/0488 |
| 9,423,909 B2* | 8/2016 | Colley | .................. | G06F 3/0488 |
| 9,448,724 B2* | 9/2016 | Arnold | ................ | G06F 3/04886 |
| 9,760,466 B2* | 9/2017 | Xu | ....................... | G06F 11/3438 |
| 9,979,833 B2* | 5/2018 | Li | ............................ | H04M 1/67 |
| 2007/0146334 A1* | 6/2007 | Inokawa | ................ | G06F 3/016 345/173 |
| 2008/0231461 A1* | 9/2008 | Sanchez | ............... | B60K 28/066 340/575 |
| 2009/0322791 A1* | 12/2009 | Wu | ..................... | G06F 3/04845 345/660 |
| 2011/0010668 A1* | 1/2011 | Feldstein | ............... | G06F 3/0488 715/822 |
| 2011/0115730 A1* | 5/2011 | Kim | .................... | G06F 3/04883 345/173 |
| 2012/0089553 A1* | 4/2012 | Mollicone | ........... | G06F 19/3431 706/52 |
| 2012/0133596 A1* | 5/2012 | Lippolis | .............. | G06F 3/04883 345/173 |
| 2012/0278073 A1* | 11/2012 | Weider | .............. | G06F 17/30864 704/235 |
| 2012/0306759 A1* | 12/2012 | Luo | ..................... | G06F 3/04886 345/168 |
| 2013/0019191 A1* | 1/2013 | Arnold | ................ | G06F 3/04886 715/765 |
| 2013/0243208 A1* | 9/2013 | Fawer | .................... | A61B 5/162 381/57 |
| 2013/0339908 A1* | 12/2013 | Bailey | ..................... | G06F 3/017 715/863 |
| 2014/0292638 A1* | 10/2014 | Lee | ......................... | G06F 3/013 345/156 |
| 2015/0206090 A1* | 7/2015 | Pakhchanyan | ...... | G06F 3/04895 705/7.42 |
| 2016/0018939 A1* | 1/2016 | Colley | ................. | G06F 3/0488 345/173 |
| 2016/0202824 A1* | 7/2016 | Xu | ....................... | G06F 3/0416 345/174 |
| 2016/0317056 A1* | 11/2016 | Moon | .................. | A61B 5/0482 |
| 2017/0034339 A1* | 2/2017 | Li | ........................ | H04M 15/58 |
| 2017/0045955 A1* | 2/2017 | Lee | ....................... | G06F 1/1616 |
| 2017/0068407 A1* | 3/2017 | Wilson | ............... | G06F 3/04842 |
| 2017/0123640 A1* | 5/2017 | Wilson | ............... | G06F 3/04842 |
| 2017/0140757 A1* | 5/2017 | Penilla | .................... | G10L 15/22 |
| 2017/0153805 A1* | 6/2017 | Du | ....................... | G06F 3/04883 |
| 2017/0220244 A1* | 8/2017 | Kim | ................... | G06F 3/04883 |
| 2017/0235407 A1* | 8/2017 | Li | ........................ | G06F 3/0416 345/173 |

FOREIGN PATENT DOCUMENTS

| | | |
|---|---|---|
| CN | 103473015 A | 12/2013 |
| CN | 104166515 A | 11/2014 |
| KR | 101337665 B1 | 12/2013 |

* cited by examiner

TOUCH MONITORING METHOD, TOUCH MONITORING DEVICE, AND TERMINAL

CROSS-REFERENCE TO RELATED APPLICATIONS

This application claims priority to Chinese application No. 201610090373.1, filed Feb. 17, 2016, which is hereby incorporated by reference in its entirety.

TECHNICAL FIELD

The present disclosure relates to the field of touch detection technology, in particular to a touch monitoring method, a touch monitoring device, and a terminal.

BACKGROUND

Along with the development of the smart phones, various operations are provided to the smart phones so as to improve the user experience, and the smart phone with a touch screen has become a trend due to its advantages such as a friendly human-machine interface, smooth operation, a single-point or multi-point touch mode, and various interface modes.

However, along with a wide use of the smart phone, the overuse thereof may lead to health risks for users. Hence, it is urgent to provide a health monitoring method for a terminal, so as to avoid the health risks for users caused by the overuse of the smart phones.

SUMMARY

An object of the present disclosure is to provide a touch monitoring method, a touch monitoring device and a terminal, so as to prevent the health risks for the users due to the overuse of the terminal.

In one aspect, the present disclosure provides in some embodiments a touch monitoring method, including steps of: acquiring a plurality of touch operations performed by a user within a predetermined time period at a predetermined touch region of a terminal; acquiring attribute information corresponding to each touch operation; and prompting the user in accordance with the attribute information corresponding to the touch operations.

Optionally, the attribute information corresponding to the touch operations includes one or more of times of the touch operations, lengths of touch trajectories, and durations of the touch operations.

Optionally, the step of acquiring the attribute information corresponding to each touch operation further includes: dividing the touch trajectory for each touch operation into at least one path; acquiring a length of each path in accordance with a start position and an end position of each path; and accumulating the lengths of the paths to acquire the length of the touch trajectory for each touch operation.

Optionally, each of the at least one path is a straight line.

Optionally, the step of prompting the user in accordance with the attribute information corresponding to the touch operations further includes: accumulating the lengths of the touch trajectories for the touch operations to acquire a sum of the lengths of the touch trajectories for the touch operations; and prompting the user in the case that the sum of the lengths of the touch trajectories for the touch operations is greater than or equal to a first predetermined threshold.

Optionally, the first predetermined threshold is pre-stored or set by the user.

Optionally, the step of prompting the user in accordance with the attribute information corresponding to the touch operations further includes: accumulating the durations of the touch operations to acquire a sum of the durations of the touch operations; and prompting the user in the case that the sum of the durations of the touch operations is greater than or equal to a second predetermined threshold.

Optionally, the second predetermined threshold is pre-stored or set by the user.

Optionally, the step of prompting the user in accordance with the attribute information corresponding to the touch operations further includes: acquiring the times of the touch operations; and prompting the user in the case that the times of the touch operations are greater than or equal to a third predetermined threshold.

Optionally, the third predetermined threshold is pre-stored or set by the user.

Optionally, the step of prompting the user includes displaying an alarm message on the terminal, or powering off the terminal.

In another aspect, the present disclosure provides in some embodiments a touch monitoring device, including: an operation acquisition module configured to acquire a plurality of touch operations performed by a user within a predetermined time period at a predetermined touch region of a terminal; an attribute information acquisition module configured to acquire attribute information corresponding to each touch operation; and a prompt module configured to prompt the user in accordance with the attribute information corresponding to the touch operations.

Optionally, the attribute information corresponding to the touch operations includes one or more of times of the touch operations, lengths of touch trajectories, and durations of the touch operations.

Optionally, the attribute information acquisition module is further configured to divide the touch trajectory for each touch operation into at least one path, acquire a length of each path in accordance with a start position and an end position of each path, and accumulate the lengths of the paths to acquire the length of the touch trajectory for each touch operation.

Optionally, each of the at least one path is a straight line.

Optionally, the prompt module is further configured to accumulate the lengths of the touch trajectories for the touch operations to acquire a sum of the lengths of the touch trajectories for the touch operations, and prompt the user in the case that the sum of the lengths of the touch trajectories for the touch operations is greater than or equal to a first predetermined threshold.

Optionally, the prompt module is further configured to accumulate the durations of the touch operations to acquire a sum of the durations of the touch operations, and prompt the user in the case that the sum of the durations of the touch operations is greater than or equal to a second predetermined threshold.

Optionally, the prompt module is further configured to acquire the times of the touch operations, and prompt the user in the case that the times of the touch operations are greater than or equal to a third predetermined threshold.

Optionally, the prompt module is further configured to display an alarm message on the terminal, or power off the terminal.

In yet another aspect, the present disclosure provides in some embodiments a terminal including the above-mentioned touch monitoring device.

According to the embodiments of the present disclosure, the plurality of touch operations performed by the user at the predetermined touch region of the terminal may be acquired within the predetermined time period, then the attribute information corresponding to each touch operation may be acquired, and then the user may be prompted in accordance with the attribute information corresponding to the touch operations. The attribute information, such as the times of the touch operations, the lengths of the touch trajectories, and the durations of the touch operations within the predetermined time period, may be acquired, so as to determine a fatigue level of the user, thereby monitoring the use of terminal in an interesting and picturesque way and preventing the health risk for the user due to the overuse of the terminal.

DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
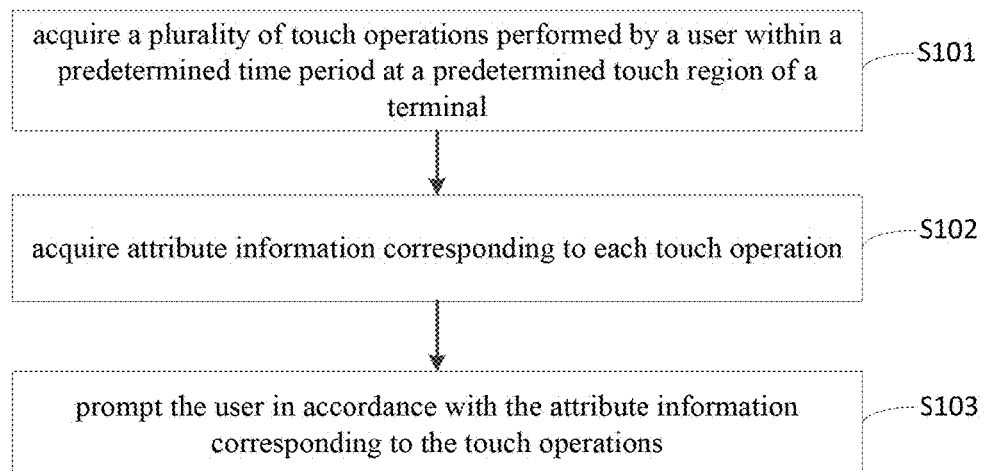
FIG. 1 is a flow chart of a touch monitoring method in some embodiments of the present disclosure.

As shown in FIG. 1, a touch monitoring method in some embodiments of the present disclosure may include the following steps.

Step S101: acquiring a plurality of touch operations performed by a user within a predetermined time period at a predetermined touch region of a terminal.

It should be appreciated that, in some embodiments of the present disclosure, the method may be executed by the terminal which may be any product or member having a touch function, such as a mobile phone, a flat-panel computer, a personal digital assistant (PDA) or a laptop computer. Of course, any other devices having a similar function may also be used, and they will not be particularly defined herein.

To be specific, the touch operation may include a clicking, sliding or holding-down operation performed by the user at the predetermined touch region. The touch operation may be detected by the terminal through a touch film at the predetermined touch region, and at this time, information about a touch position, a touch duration and times of the touch operations may be acquired.

Step S102: acquiring attribute information corresponding to each touch operation.

To be specific, the attribute information corresponding to the touch operations may include one or more of times of the touch operations, lengths of touch trajectories, and durations of the touch operations. It should be appreciated that, the attribute information may also be other attribute information representing a use state of the terminal, which is not limited herein.

Step S103: prompting the user in accordance with the attribute information corresponding to the touch operations.

To be specific, different predetermined thresholds may be provided for different attribute information, and the attribute information may be compared with the corresponding predetermined threshold. In the case that a value representing the attribute information is greater than or equal to the corresponding predetermined threshold, the user may be prompted to have a rest.

It can be seen that, according to the embodiments of the present disclosure, the plurality of touch operations performed by the user at the predetermined touch region of the terminal may be acquired within the predetermined time period, then the attribute information corresponding to each touch operation may be acquired, and then the user may be prompted in accordance with the attribute information corresponding to the touch operations. The attribute information, such as the times of the touch operations, the lengths of the touch trajectories, and the durations of the touch operations within the predetermined time period, may be acquired, so as to determine a fatigue level of the user, thereby monitoring the use of terminal in an interesting and picturesque way and preventing the health risk for the user due to the overuse of the terminal.

Step S102 will be described hereinafter in more details.

To be specific, in some embodiments of the present disclosure, the attribute information may include the lengths of the touch trajectories.

Figure 2:
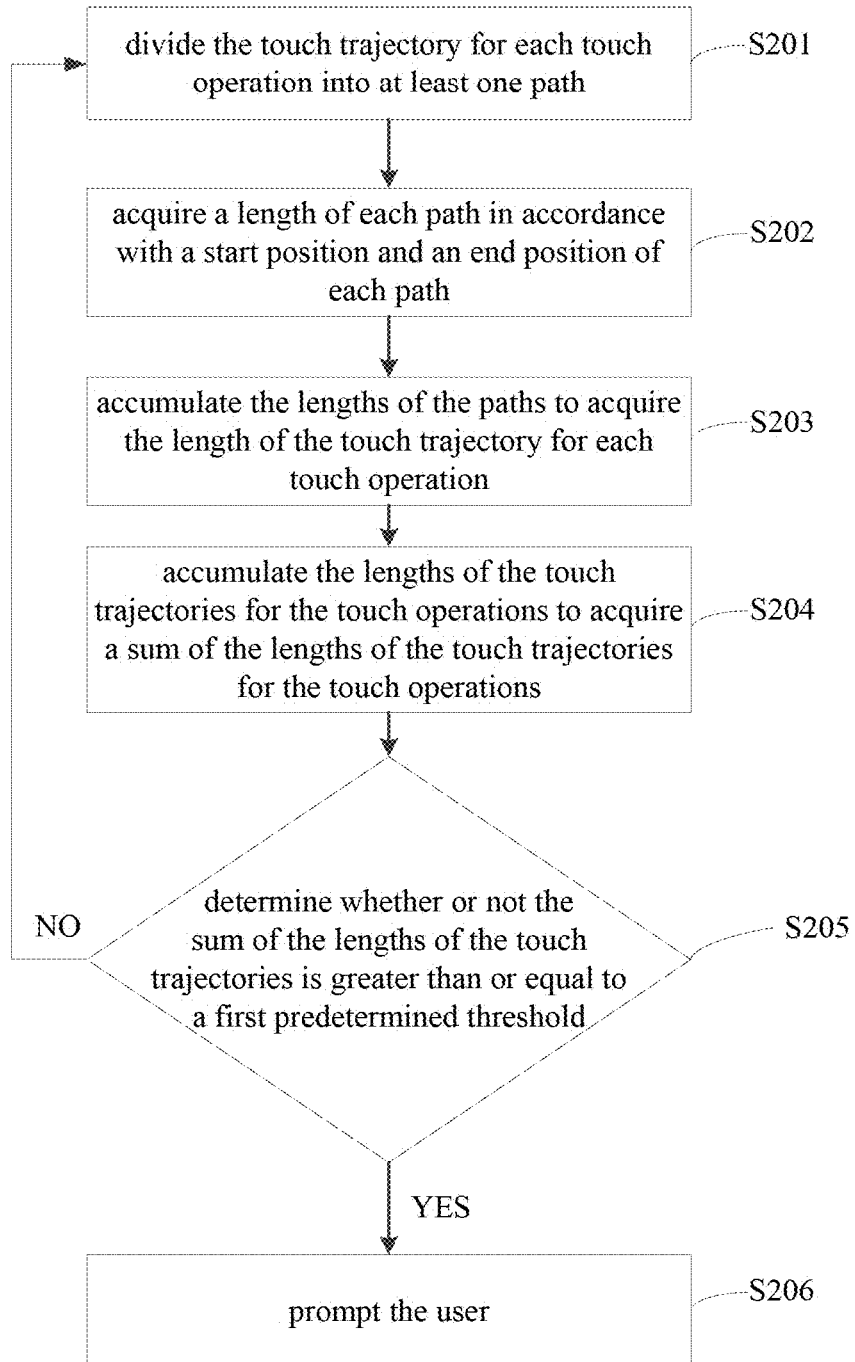
FIG. 2 is another flow chart of the touch monitoring method in some embodiments of the present disclosure.

As shown in FIG. 2, Step S102 may further include the following steps.

Step S201: dividing the touch trajectory for each touch operation into at least one path.

To be specific, the touch trajectory for each touch operation may be a straight line, or a non-straight line such as a curved or folded line. It should be appreciated that, the path may be a straight line or a line very close to a straight line.

In the case that the touch trajectory for the touch operation is a straight line, it may be directly taken as the path. In the case that the touch trajectory is not a straight line, it may be divided into a plurality of paths, and each path may be a straight line or a line very close to a straight line.

Step S202: acquiring a length of each path in accordance with a start position and an end position of each path.

To be specific, the terminal may detect a touch position for the touch operation. A touch screen of the terminal in the related art may be a resistive screen or a capacitive screen. For the resistive screen which mainly includes two conductive layers, the touch operation is detected by sensing a pressure. In the case that the screen is touched by a finger, the two conductive layers are in contact with each other at a touch point, leading to a resistance change. At this time, signals are generated in both an X-axis direction and a Y-axis direction and transmitted to a controller of the touch screen. Then, coordinates (X, Y) of the touch point may be calculated by the controller in accordance with the signals. For the capacitive screen, the touch operation is detected by sensing a current from a human body. In the case that the screen is touched by the finger, a coupling capacitor is formed between the finger and a surface of the screen due to an electric field of the human body. For a high-frequency current, the capacitor is a direct conductor. At this time, a very small current generated between the finger and the touch point may be divided into four parts and flowing toward four electrodes at four corners of the screen. Values of the portions of the current are in direct proportion to distances between the finger and the electrodes, so the touch position may be determined in accordance with the ratio among the portions of the current. Hence, the start position and the end position of the path may be acquired.

In the case that the touch trajectory corresponding to the touch operation is a straight line, the start position and the end position of the straight line may be directly recorded so as to acquire the length of the touch trajectory. In the case that the touch trajectory is not a straight line, the touch trajectory may be divided into a plurality of paths, the start position and the end position of each path may be recorded so as to acquire the length of each path, and then a sum of the lengths of the paths may be acquired as the length of the trajectory length.

Step S203: accumulating the lengths of the paths to acquire the length of the touch trajectory for each touch operation.

In addition, as shown in FIG. 2, Step S103 may include: Step S204 of accumulating the lengths of the touch trajectories for the touch operations to acquire a sum of the lengths of the touch trajectories for the touch operations; Step S205 of determining whether or not the sum of the lengths of the touch trajectories is greater than or equal to a first predetermined threshold, and if the sum of the lengths of the touch trajectories is greater than or equal to a first predetermined threshold, the step is proceeded to Step S206, otherwise, the step is returned to Step S201; and Step S206 of prompting the user in the case that the sum of the lengths of the touch trajectories is greater than or equal to the first predetermined threshold.

Figure 3:
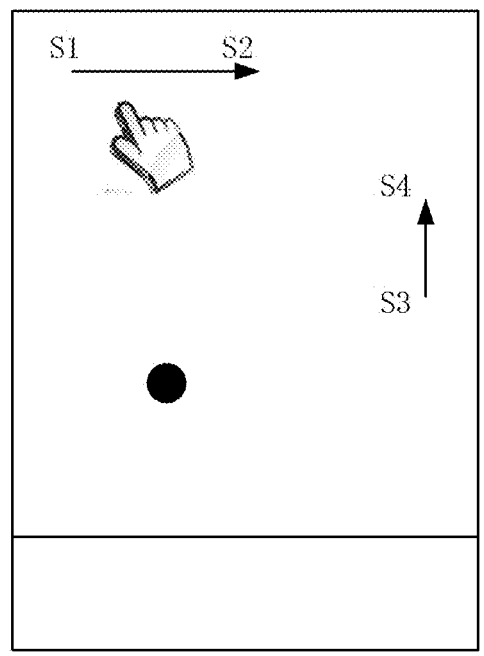
FIG. 3 is a schematic view showing the acquisition of a length of a touch trajectory in some embodiments of the present disclosure.

For example, as shown in FIG. 3, a plurality of touch operations is performed within a predetermined time period and a touch trajectory for each touch operation is a straight line. As shown in FIG. 3, a start position and an end position for each time of sliding may be recorded. At this time, a length of each path may be calculated. For instance, at a time point t1, coordinates $(X1, Y1)$ of a start point S1 and coordinates $(X2, Y2)$ of an end point S2 may be recorded, so as to acquire a length of the path, i.e., $|S1-S2|=\sqrt{(X1-X2)^2+(Y1-Y2)^2}$. At a time point t2, a length $|S3-S4|$ may be acquired in a similar manner. Therefore, at time point tn, the sum of the lengths Ln of the touch trajectories for n touch operations within the predetermined time period may be calculated through a formula $Ln=|S1-S2|+|S3-S4|+\ldots+|S(2n-1)-S2n|$.

Further, Ln may be compared with the first predetermined threshold. In the case that Ln is greater than or equal to the first predetermined threshold, the user may be prompted by an alarm. It should be appreciated that, the first predetermined threshold may be pre-stored in a system or set by the user.

Step S103 will be described hereinafter in more details.

In some embodiments of the present disclosure, the attribute information may include a duration of the touch operation. At this time, Step S103 may include: Step A01 of accumulating the durations of the touch operations to acquire a sum of the durations of the touch operations; and Step A02 of prompting the user in the case that the sum of the durations of the touch operations is greater than or equal to a second predetermined threshold.

To be specific, for each touch operation, a time point corresponding to a start position and a time point corresponding to an end position may be recorded, so as to acquire the duration for the touch operation. The durations of the touch operations within the predetermined time period may be accumulated so as to acquire the sum of the durations of the touch operations. Then, the sum of the durations of the touch operations may be compared with the second predetermined threshold, and then the user may be prompted in accordance with a comparison result. It should be appreciated that, the second predetermined threshold may be pre-stored in a system or set by the user.

Step S103 will be described hereinafter in more details.

In some embodiments of the present disclosure, the attribute information may include times of the touch operations. At this time, Step S103 may include: Step B01 of acquiring the times of the touch operations; and Step B02 of prompting the user in the case that the times of the touch operations are greater than or equal to a third predetermined threshold.

To be specific, once a touch operation has been detected, the times of the touch operations may be taken as 1. In the case that n touch operations have been detected within the predetermined time period, the times of the touch operations may be taken as n. Then, the times n of the touch operations may be compared with the third predetermined threshold. In the case that n is greater than or equal to the third predetermined threshold, the user may be prompted by an alarm. It should be appreciated that, the third predetermined threshold may be pre-stored in a system or set by the user.

Further, Step S103 may specifically include displaying an alarm message on the terminal, or powering off the terminal.

To be specific, in the case that any one of the above-mentioned requirements is met, the alarm message may be displayed on the terminal, or the terminal may be directly powered off, so as to prompt or make the user to have a rest.

It should be appreciated that, if the value representing the attribute information is greater than the corresponding predetermined threshold, a prompting mode of the terminal may be set by the user in accordance with the practical need. For example, the terminal may vibrate, ring, send a prompt message or be powered off, which is not limited herein. In this way, the user experience may be further improved if the prompting mode is selectable, thereby to prevent the use of the terminal from being adversely affected due to some prompting modes (e.g., ringing or powering-off).

Figure 4:
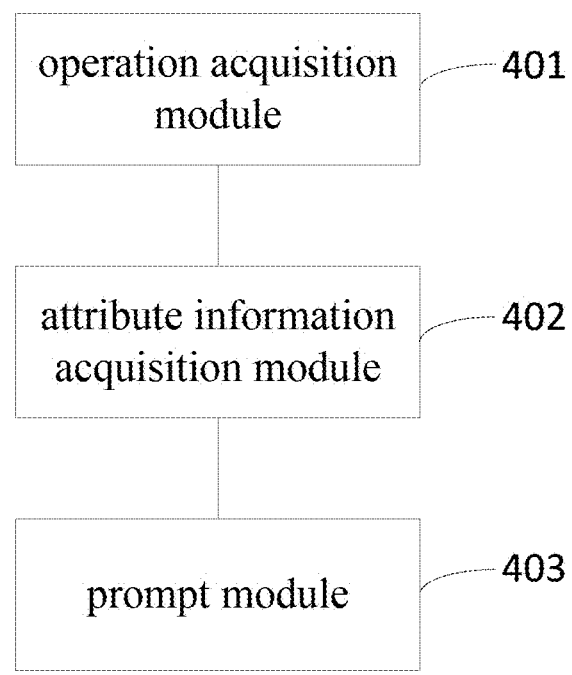
FIG. 4 is a schematic view showing a touch monitoring device n some embodiments of the present disclosure.

As shown in FIG. 4, a touch monitoring device in some embodiments of the present disclosure may include: an operation acquisition module 401 configured to acquire a plurality of touch operations performed by a user within a predetermined time period at a predetermined touch region of a terminal; an attribute information acquisition module 402 configured to acquire attribute information corresponding to each touch operation; and a prompt module 403 configured to prompt the user in accordance with the attribute information corresponding to the touch operations.

In some embodiments of the present disclosure, the attribute information corresponding to the touch operations may include one or more of times of the touch operations, lengths of touch trajectories, and durations of the touch operations.

According to the embodiments of the present disclosure, the operation acquisition module 401 may acquire the plurality of touch operations performed by the user at the predetermined touch region of the terminal within the predetermined time period, then the attribute information acquisition module 402 may acquire the attribute information corresponding to each touch operation, and then the prompt module 403 may prompt the user in accordance with the attribute information corresponding to the touch operations. The attribute information, such as the times of the touch operations, the lengths of the touch trajectories, and the durations of the touch operations within the predetermined time period may be acquired, so as to determine a fatigue level of the user and then prompt the user, thereby monitoring the use of terminal in an interesting and picturesque way and preventing the health risk for the user due to the overuse of the terminal.

In some embodiments of the present disclosure, the attribute information acquisition module 402 is further configured to divide the touch trajectory for each touch operation into at least one path, acquire a length of each path in accordance with a start position and an end position of each path, and accumulate the lengths of the paths to acquire the length of the touch trajectory for each touch operation.

In addition, the prompt module 403 is further configured to accumulate the lengths of the touch trajectories for the touch operations to acquire a sum of the lengths of the touch trajectories for the touch operations, and prompt the user in the case that the sum of the lengths of the touch trajectories for the touch operations is greater than or equal to a first predetermined threshold.

Optionally, the prompt module 403 is further configured to accumulate the durations of the touch operations to acquire a sum of the durations of the touch operations, and prompt the user in the case that the sum of the durations of the touch operations is greater than or equal to a second predetermined threshold.

Optionally, the prompt module 403 is further configured to acquire the times of the touch operations, and prompt the user in the case that the times of the touch operations are greater than or equal to a third predetermined threshold.

In some embodiments of the present disclosure, the prompt module 403 is further configured to display an alarm message on the terminal, or power off the terminal.

It should be appreciated that, the implementations of the touch monitoring device may refer to those of the touch monitoring method mentioned above.

Based on an identical inventive concept, the present disclosure further provides in some embodiments a terminal including the above-mentioned touch monitoring device. The terminal may be any product or member having a touch function, such as a mobile phone, a flat-panel computer, a PDA or a laptop computer. Of course, any other devices having a similar function may also be used, which will not be limited herein. The terminal includes the touch monitoring device described hereinabove, so it may solve the issues mentioned above and achieve the same technical effect.

It should be noted that, orientations and position relationships indicated by such words as "upper" and "lower" are based on the drawings, which is merely for ease of description and to simplify the description, rather than to indicate or imply that the device or the components should be arranged or operated in the way defined by such words, and thus the present disclosure is not limited herein. Unless otherwise defined, such words as "mount", "joint" or "connect" should be understood in a board sense. For example, the connection may be a fixed connection, a removable connection, or an integral connection; in addition, the connection may be a mechanical connection or an electrical connection; in addition, the connection may be a direct connection, a connection by an intermediate medium, or an internal connection between two components. The words hereinabove in the present disclosure may be understood by those skilled in the art in different contexts.

It should be noted that, such words as "first" and "second" used in the specification and claims are merely used to differentiate different operation bodies rather than to represent any order or relationship. In addition, such words as "comprise" or "comprising" or the variant thereof is non-exclusive, such that the process, method, object or device including certain features not only includes these certain features but also includes other features which is not included or further include the inherent features of the process, method, object or device. The features defined by such words as "comprise a" is non-exclusive, and other feature of the process, method, object or device are not excluded.

The above are merely the preferred embodiments of the present disclosure. Obviously, a person skilled in the art may make further modifications and improvements without departing from the spirit of the present disclosure, and these modifications and improvements shall also fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A touch monitoring method, comprising steps of:
   acquiring a plurality of touch operations performed by a user within a predetermined time period at a predetermined touch region of a terminal;
   acquiring attribute information corresponding to each touch operation; and
   prompting the user in accordance with the attribute information corresponding to the touch operations;
   wherein the attribute information corresponding to the touch operations comprises one or more of times of the touch operations, lengths of touch trajectories, and durations of the touch operations;
   wherein the step of acquiring the attribute information corresponding to each touch operation further comprises:
      defining the touch trajectory for each touch operation as one path or dividing the touch trajectory for each touch operation into a plurality of paths;
      acquiring a length of the one path or each of the plurality of paths in accordance with a start position and an end position of the one path or each of the plurality of paths; and
      calculating the length of the one path or accumulating the lengths of the plurality of paths to acquire the length of the touch trajectory for each touch operation.

2. The touch monitoring method according to claim 1, wherein the one path and each of the plurality of paths are each a straight line.

3. The touch monitoring method according to claim 1 wherein the step of prompting the user in accordance with the attribute information corresponding to the touch operations further comprises:
   accumulating the lengths of the touch trajectories for the touch operations to acquire a sum of the lengths of the touch trajectories for the touch operations; and
   prompting the user, in the case that the sum of the lengths of the touch trajectories for the touch operations is greater than or equal to a first predetermined threshold.

4. The touch monitoring method according to claim 3, wherein the first predetermined threshold is pre-stored or set by the user.

5. The touch monitoring method according to claim 1, wherein the step of prompting the user in accordance with the attribute information corresponding to the touch operations further comprises:
   acquiring the times of the touch operations; and
   prompting the user, in the case that the times of the touch operations are greater than or equal to a third predetermined threshold.

6. The touch monitoring method according to claim 5, wherein the third predetermined threshold is pre-stored or set by the user.

7. The touch monitoring method according to claim 1, wherein the step of prompting the user comprises displaying an alarm message on the terminal, or powering off the terminal.

8. A terminal, comprising a touch monitoring device, wherein the touch monitoring device comprises:
   an operation acquisition module, configured to acquire a plurality of touch operations performed by a user within a predetermined time period at a predetermined touch region of a terminal;
   an attribute information acquisition module, configured to acquire attribute information corresponding to each touch operation; and
   a prompt module, configured to prompt the user in accordance with the attribute information corresponding to the touch operations;
   wherein the attribute information corresponding to the touch operations comprises one or more of times of the touch operations, lengths of touch trajectories, and durations of the touch operations;
   wherein the attribute information acquisition module is further configured to define the touch trajectory for each touch operation as one path or divide the touch trajectory for each touch operation into a plurality of paths, acquire a length of the one path or each of the plurality of paths in accordance with a start position and an end position of the one path or each of the plurality of paths, and calculate the length of the one path or accumulate the lengths of the plurality of paths to acquire the length of the touch trajectory for each touch operation.

9. The terminal according to claim 8, wherein the one path and each of the plurality of paths are each a straight line.

10. The terminal according to claim 8, wherein the prompt module is further configured to accumulate the lengths of the touch trajectories for the touch operations to acquire a sum of the lengths of the touch trajectories for the touch operations, and prompt the user in the case that the sum of the lengths of the touch trajectories for the touch operations is greater than or equal to a first predetermined threshold.

11. The terminal according to claim 8, wherein the prompt module is further configured to accumulate the durations of the touch operations to acquire a sum of the durations of the touch operations, and prompt the user in the case that the sum of the durations of the touch operations is greater than or equal to a second predetermined threshold.

12. The terminal according to claim 8, wherein the prompt module is further configured to acquire the times of the touch operations, and prompt the user in the case that the times of the touch operations are greater than or equal to a third predetermined threshold.

13. The terminal according to claim 8, wherein the prompt module is further configured to display an alarm message on the terminal, or power off the terminal.

14. A touch monitoring method, comprising:
   acquiring a plurality of touch operations performed by a user within a predetermined time period at a predetermined touch region of a terminal;
   acquiring attribute information corresponding to each touch operation; and
   prompting the user in accordance with the attribute information corresponding to the touch operations;
   wherein the attribute information corresponding to the touch operations comprises one or more of times of the touch operations, lengths of touch trajectories, and durations of the touch operations;
   wherein the step of prompting the user in accordance with the attribute information corresponding to the touch operations further comprises:
   accumulating the durations of the touch operations to acquire a sum of the durations of the touch operations; and
   prompting the user, in the case that the sum of the durations of the touch operations is greater than or equal to a second predetermined threshold.

15. The touch monitoring method according to claim 14, wherein the second predetermined threshold is pre-stored or set by the user.

* * * * *